Sept. 25, 1951 W. C. GREF ET AL 2,569,050
ARTICLE LIFTING AND TRANSPORTING DOLLY
Filed Jan. 17, 1950 2 Sheets-Sheet 2
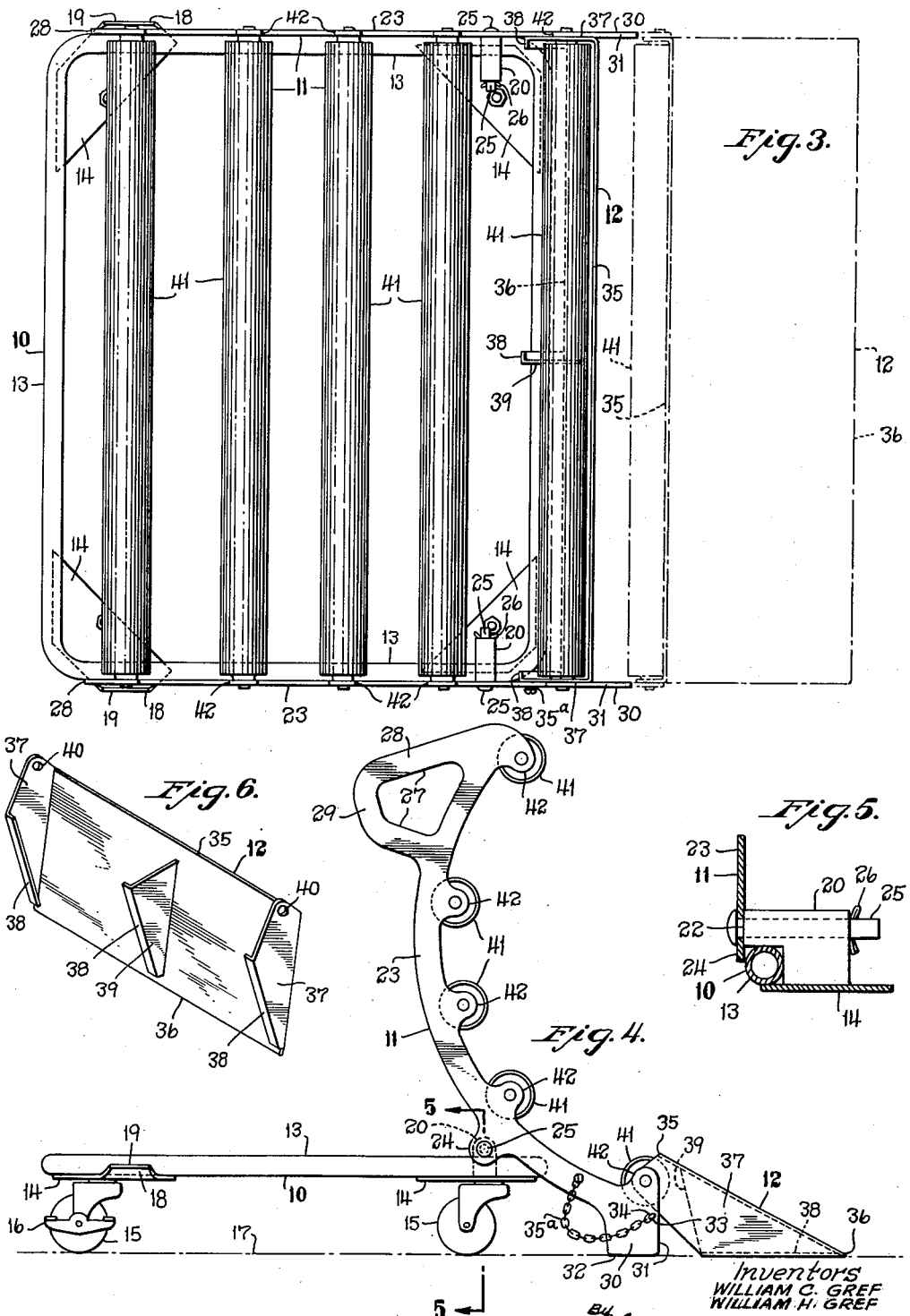

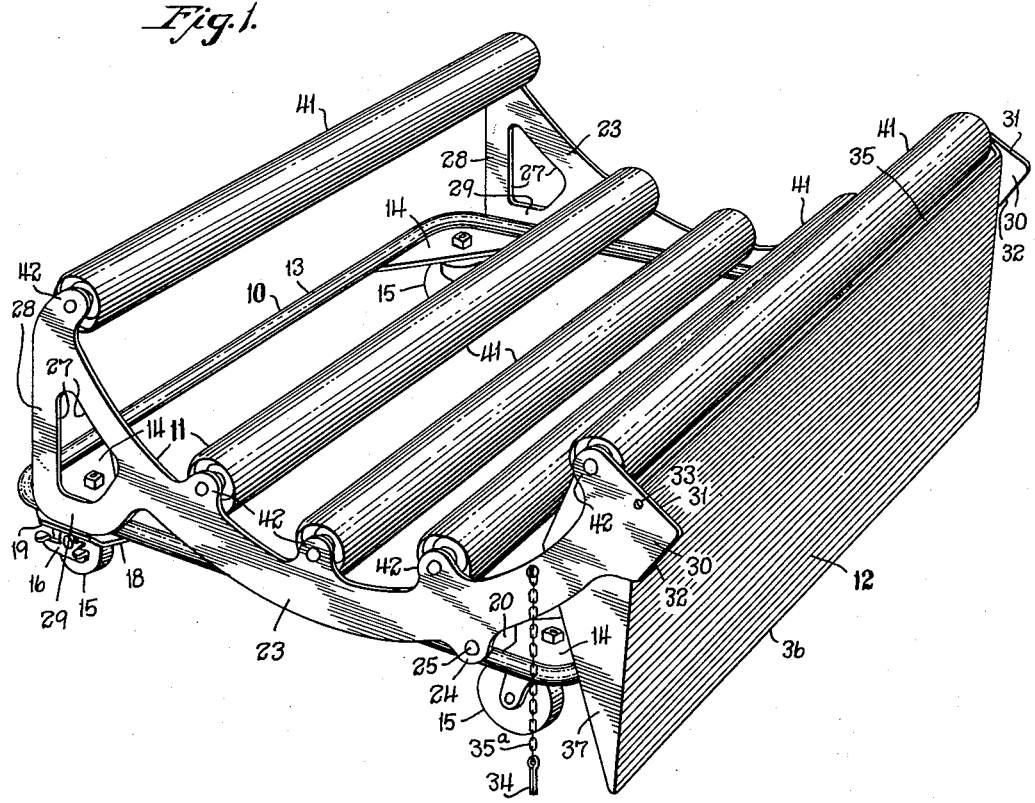

Patented Sept. 25, 1951

2,569,050

UNITED STATES PATENT OFFICE 2,569,050

ARTICLE LIFTING AND TRANSPORTING DOLLY

William C. Gref and William H. Gref, Westport, Conn.

Application January 17, 1950, Serial No. 139,042

14 Claims. (Cl. 214—85)

1

The present invention relates in general to article-carriers and in particular to an improved device for lifting and transporting relatively-heavy substantially-cylindrical articles such as, for example, rolled rugs, rolled linoleum, drums, and articles of an equivalent nature.

An object of the invention is to provide a superior article-lifting-and-transporting device which is of durable and inexpensive construction and designed to facilitate handling and transporting rolled rugs and articles of a similar nature.

A further object of the invention is to provide an article-transporting carriage with superior means for loading and unloading articles onto and from the carriage.

A still further object of the present invention is to provide an article-transporting dolly with an article-lifting member which is movable relative to the carriage of the dolly so as to facilitate lifting an article onto the dolly.

A still further object of the invention is to provide an article-transporting dolly with a tiltable article-lifting-and-supporting cradle having a ramp hinged thereto adapted to move automatically into position to facilitate moving an article onto the cradle.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a perspective view of the improved dolly of this invention showing the cradle of the dolly mounted in its normal position on the carriage-member and the ramp of the cradle in its inoperative position;

Fig. 2 is an end elevation of the dolly as shown in Fig. 1, a rolled rug or equivalent article being supported on the rollers of the cradle, as indicated by the broken lines;

Fig. 3 is a plan view of the dolly of Fig. 1 with the ramp of the cradle shown by broken lines extended laterally in operating position;

Fig. 4 is an end elevation of the dolly with the cradle swung upwardly in position to receive an article from the extended ramp of the cradle;

Fig. 5 is an end elevation of the carriage-member of the dolly on the section line 5—5 of Fig. 4, which is taken through one corner of the carriage-member and shows details of the pivot-

2 bearing for the cradle of the carriage-member; and

Fig. 6 is a perspective view of the ramp of the cradle showing details of the underside of the ramp.

Referring to the drawings, the latter show an exemplary embodiment of the invention in the form of an improved dolly for handling rolled rugs, rolled linoleum, and articles of an equivalent nature, the dolly comprising a base or carriage-member indicated generally at 10 and an article-lifting-and-supporting member or platform, hereinafter referred to as a "cradle-member," indicated generally at 11, the latter being fulcrumed to one side of the carriage-member, which side is hereinafter referred to as the "fulcrum" side of the carriage, for movement relative thereto in the manner hereinafter described. Supported on the corresponding side of the cradle is a ramp indicated generally at 12, the side of the cradle to which the ramp is connected being hereinafter referred to as the "ramp" side of the cradle.

Referring more especially to Fig. 3, the carriage-member 10 comprises a rigid substantially-rectangular frame 13 formed of metal and preferably of tubular stock, although flat or angle stock may be used. At each of its four corners the frame is provided with a flat substantially-triangular reinforcing-plate 14, each of which is formed with a vertical aperture substantially centrally thereof to accommodate a caster 15, the four casters being adapted to support the frame for horizontal movement over a floor or other supporting-surface. At least two of the casters, and preferably the two casters on the side of the frame opposite its fulcrum side, are provided with a locking-mechanism indicated generally at 16 whereby the carriage-member may be temporarily held from moving across the floor or other supporting-surface 17 while loading and unloading an article onto and off of the cradle-member 11.

Referring again to the triangular corner-reinforcing plates 14, the two plates at the corners of that side of the carriage-member which is opposite its fulcrum side are formed or otherwise provided with extensions 18 which project outwardly from the corresponding ends of the carriage-member in the direction of its longitudinal axis, each extension 18 constituting a cradle-rest for supporting the corresponding arms of the cradle. Moreover, the distal end of each cradle-rest 18 is bent upwardly at a slight angle to provide a restraining-lip 19 adapted to engage the outer edge of the corresponding arm of the cradle, as shown especially well in Figs. 2 and 3. Thus, when the cradle-member is supported in its normal position on the rest 18 of the carriage-member, the lips 19 of the rests prevent the cradle-member from cocking laterally with respect to the carriage-member.

The ramp side of the cradle-member is adapted to be pivotally connected to the corresponding fulcrum side of the carriage-member so that the cradle-member may be tilted or swung upwardly from its normal position on the rests 18 of the carriage-member to its article-loading-and-lifting position indicated in Fig. 4. To this end, the carriage-member is provided immediately adjacent its fulcrum side with a pair of pivot-bearings 20 welded or otherwise fixed to the top-side of the corresponding corner-reinforcing plate 14 of the frame, as shown especially well in Fig. 5. In accordance with this construction, the longitudinal axis of each pivot-bearing 20 is in alignment and substantially parallel to the longitudinal axis of the carriage-member, the outer end of each pivot-bearing extending across the upper side of the corresponding end-member of the carriage and terminating in a substantially-vertical outer bearing-face 22.

Referring especially to Figs. 1, 2 and 3, the cradle-member 11 of the dolly comprises two end-members or arms 23, each of which may be conveniently formed from flat sheet metal, the longitudinal axis of which is formed on the arc of a circle, the center of which is above the horizontal plane of the carriage. Moreover, when the cradle is mounted on the carriage, as hereinafter described, the center of each arc is eccentric to the longitudinal axis of the carriage, the eccentricities of the centers of curvature of the arcuate arms 23 favoring the fulcrum side of the carriage. Each arm 23 has an apertured lobe 24 depending from its arcuate bottom edge adjacent the ramp side of the cradle to receive a pivot-pin 25 for pivotally securing each arcuate arm 23 of the cradle to the pivot-bearings of the carriage. Thus, to mount the cradle on the carriage, the arms 23 of the cradle are arranged above and substantially parallel to the corresponding end-members of the carriage with the inner faces of the apertured lobes 24 of the cradle in engagement with the corresponding outer bearing-faces 22 of the pivot-bearings 20, whereupon the pivot-pins 25 are inserted in the axially-aligned apertures of the respective lobes and bearings, the pivot-pins being secured therein by cotter pins 26 or equivalent fastening-means.

In its normal position, the cradle is adapted to be supported on the carriage in a plane substantially parallel to the horizontal plane thereof, that is to say, a plane intersecting the ends of the arcuate arms 23 of the cradle would be substantially parallel to the horizontal plane of the carrier. To this end, the ends of the arcuate arms 23—23 of the cradle opposite the ramp side thereof, which ends are hereinafter referred to as the "outer" ends of the arcuate arms 23, are provided with substantially-rectilinear loop-portions 27 in the respective planes thereof, each loop-portion being formed integrally with or otherwise secured to its respective arm and having a straight outer side 28 adapted, in the normal position of the cradle, to extend upwardly substantially perpendicularly with respect to the horizontal plane of the carriage; and a substantially-straight flat bottom side hereinafter referred to as a "step" 29 at substantially right angles to the outer side 28 of its respective loop-portion 27, each step 29 being adapted to seat on the corresponding cradle-rest 18 of the carriage whereby the corresponding end of the cradle is supported thereon. As shown especially well in Fig. 1, since each step 29 is engaged closely between the outer wall of the corresponding end-member of the carriage and the upturned lip 19 of its respective cradle-rest 18, the cradle is effectively held from lateral displacement relative to the carriage.

The opposite or inner end of each arm 23 of the cradle is formed with an integral web-portion indicated generally at 30, each web-portion 30 being substantially rectangular and in the plane of its corresponding cradle-arm 23. As shown especially well in Fig. 2, the outer edge 31 of each web-portion 30 extends at substantially right angles to the longitudinal axis of its respective arm such that the bottom edge 32 of the web, being at substantially right angles to its outer edge 31, is, in the normal position of the cradle, in an elevated position above the carriage, as shown especially well in Fig. 2. Moreover, the distance from each pivot-pin 25 of the cradle to the median line of its corresponding web 30 bears a specific relationship to the distance from the bottom edge 32 of the web to the point of intersection of the median line of the web with a line through the pivot-pin of the cradle-arm such that when the cradle is elevated into its operating position, as shown in Fig. 4, the lower or bottom edge 32 of the web 30 will engage the floor 17 or other support of the carriage at a point which is outside of a vertical line through the pivot-pins 25 of the cradle. In accordance with this construction, the lower or bottom edge 32 of each web 30 constitutes a landing-foot which limits the upward displacement of the cradle with respect to the carriage and also supports the load during the transition of an article from the floor onto the cradle, in the manner hereinafter described.

One of the web-portions 30 is also provided with an aperture 33 adjacent the outer edge 31 of the web for accommodating a cotter pin 34 or equivalent means attached by a chain 35a to the corresponding side of the cradle, the cotter pin being provided for locking the ramp in an outwardly-extending operating position with respect to the cradle for unloading a carpet therefrom, in the manner hereinafter described.

The ramp 12 of the cradle constitutes a rectangular flat sheet-metal plate substantially equal in length to the length of the cradle; and having upper and lower edges 35 and 36 respectively. Depending from the underside thereof at its opposite ends are sheet-metal flanges 37, the bottom edge of each flange 37 being provided with a right-angled lip 38 constituting a footing for the flange. A third substantially-triangular flange 39 is welded or otherwise secured on the underside of the ramp substantially intermediate the end-flanges 37 thereof and is likewise provided with a footing-lip 38 on its bottom edge, the three flanges constituting means for rigidly supporting the ramp on the supporting-surface or floor 17 when the ramp is in use, as shown especially well in Fig. 4.

Referring to Fig. 6, the end-flanges 37 of the ramp are provided with apertures 40 which are in axial alignment, by which the corresponding ends of the ramp are pivotally supported on the pivot-means of an antifriction article-supporting element of the dolly which, in the preferred embodiment, comprises a roller pivotally supported on the ramp side of the cradle between the arms thereof, the apertured portions of the end-flanges 37 of the ramp engaging between the respective inner faces of the cradle-arms, and the outer ends of the cradle-roller. Furthermore, it will be noted from Fig. 4 that the apertures 40 in the end-flanges 37 of the ramp are located in such relationship to the inclined working surface thereof that when the ramp is in its operating position, the upper edge 35 of the ramp overlies the cradle-roller at the ramp side thereof.

The rollers of the cradle are indicated generally at 41 and constitute elongated cylindrical members substantially equal in length to the length of the cradle and each mounted at its opposite ends between the respective arms of the cradle by suitable pivot-means, the outer ends of the pivot-means of each roller being supported in axially-aligned apertured lobes 42 formed integrally with and projecting upwardly from the upper edge of the corresponding arcuate arms 23 of the cradle. In the preferred construction of this invention, five rollers 41 are mounted on the cradle, the two outermost rollers, hereinafter referred to as "guide-rollers," being at the outer ends of the arcuate arms of the cradle, while the remaining three article-supporting rollers are mounted adjacent the center of the cradle and substantially symmetrically with respect to the longitudinal axis of the cradle, that is to say, the distance between each outer guide-roller and its adjacent article-supporting roller is greater than the distance between the center article-supporting roller and the article-supporting rollers on opposite sides respectively thereof.

The operation of the dolly is as follows. Assuming that the dolly has been rolled into proximity to a rolled rug preparatory to lifting the latter onto the dolly, and that the cradle 11 of the dolly is in its normal position on the carriage 10 as indicated in Fig. 1, then to lift a rolled rug or similar article onto the dolly, the operator seizes hold of the loop-portions 27 at the opposite side of the cradle, which loops constitute, in effect, hand-holds, and swings the cradle upwardly in a vertical plane with respect to the carriage until the landing-feet 32 adjacent the ramp edge of the cradle engage the floor on which the dolly is supported, whereupon further upward movement of the cradle is prevented. Simultaneously, the ramp 12 is swung outwardly relative to the cradle until the ramp 12, and in particular its depending bracing-flanges 37 and 39, rests squarely on the floor with the lower edge 36 of the ramp substantially at floor level and the upper edge 35 of the ramp overlying the adjacent roller 41 of the cradle. The elements of the dolly are in the related positions shown in Fig. 4. Having locked the dolly against movement by means of the locking-mechanism 16 of two of its casters, the operator proceeds to push a rolled rug up the ramp 12 and over the upper edge thereof onto the rollers of the cradle and in particular the guide-roller 41 at the outer or ramp side of the cradle and the next-succeeding inner supporting-roller thereof. In this connection, it will be noted that due to the relatively-wide lateral spacing of the two aforesaid rollers, an appreciable bulk of the roller rug is permitted to nestle down between the aforesaid rollers such that the guide-roller in particular, will effectively prevent the rolled rug from riding up over the upper edge 35 of the ramp as the cradle is lowered. Moreover, while the rug is held in its transient position between the guide-roller and the next-succeeding inner supporting-roller of the cradle, the weight of the rug acts downwardly and substantially on the median lines of the landing-feet 32 of the cradle such that the latter support the greater portion of the weight of the rug, thereby relieving the pivot-pins 25 of the cradle and the casters of the carriage. Now, by seizing the hand-holds 27 of the cradle and pulling the latter downwardly, the lever action of the pivoted cradle elevates the ramp side thereof, thereby lifting the rug upwardly. As the rug is raised above the axes of the pivot-pins 25, the weight vector of the rug moves inwardly toward the pivot-pins 25, thereby diminishing the weight moment of the rug such that the cradle will swing down automatically into its normal position on the carriage. As the cradle swings down into its normal position on the carriage, the rug will roll down from the outer guide-roller onto the three center supporting-rollers as shown especially well in Fig. 2, these center rollers serving to support the rolled rug for transportation by the dolly. It is also apparent that the three center rolls of the dolly not only support the rug, but will enable the operator to unroll the rug while in situ on the center rolls for the purpose of inspection or for unrolling the rug onto an elevated display-rack or beam; and that by supporting the pivot-means of the rollers in the upstanding lobes 42 of the cradle, the rolled rug or equivalent article is effectively held above and hence prevented from engaging the upper edges of the cradle-arms.

After the rug has been lifted and transferred for whatever purposes desired, it may be removed from the dolly in the following manner. First the ramp 12 is swung upwardly and outwardly relative to the cradle and secured in its operating position by engaging the cotter pin 34 in the aperture 33 of the cradle-web 30, in the manner shown in Fig. 4. Thereupon the cradle is elevated with respect to the carriage until the rug nestles between the outer guide-roller and the next-succeeding inner supporting-roller of the cradle, whereupon by exerting a minimum of effort, the operator may roll the rug over the upper edge of the ramp from which the rug will roll freely onto the floor. When not in use and for the purpose of storing and compactness, the cotter pin 34 is withdrawn from the landing-foot of the cradle so as to unlock the ramp and permit the latter to swing down and hang in a substantially-vertical position between the landing-feet, with its lower edge clearing the floor.

The improved dolly of this invention thus provides economical and durable means for lifting and transporting rolled rugs and similar articles with a minimum of effort and maximum efficiency and dispatch, the improved dolly being characterized by a carriage-and-cradle assembly wherein the cradle is fulcrumed to the carriage in eccentric relation to the longitudinal axis thereof to provide maximum leverage for lifting a rolled rug onto the carriage, the cradle overlying the periphery of the carriage and being adapted to be supported thereby normally and held from movement laterally with respect thereto, the cradle itself carrying a pivoted ramp which is adapted to swing back into its inoperative position when the dolly is not in use. A further feature of the invention is the relative location of the center rolls and outer guide-rolls of the cradle which facilitates loading a rolled rug onto the cradle and the subsequent unrolling of the rug while on the cradle, for inspection and similar purposes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. In a device for handling rolled rugs and articles of a similar nature, the combination including: a carriage-member; article-supporting elements carried by said carriage-member; an article-lifting member; fulcrum-means arranged to mount said article-lifting member on said carriage-member for pivotal movement upwardly relative thereto, said fulcrum-means being offset laterally with respect to the longitudinal axes of said carriage and said article-lifting member to provide said article-lifting member with a lever action to facilitate lifting an article onto the article-supporting elements of said carriage; rests on said carriage arranged normally to support said fulcrumed article-lifting member on said carriage substantially in the horizontal plane thereof; a ramp; pivotal-means arranged to mount said ramp on the side of said lifting-member adjacent said fulcrum-means whereby said ramp is adapted to be lowered into position to facilitate loading an article onto said article-lifting member when the latter is in its upright position with respect to said carriage; and means carried by said article-lifting member arranged to be detachably engaged with said ramp to lock said ramp in article-unloading position.

2. In a device for handling rolled rugs and articles of a similar nature, the combination including: a carriage-member; an article-lifting cradle-member; fulcrum-means arranged to mount said article-lifting cradle-member on said carriage-member for pivotal movement upwardly relative thereto, said fulcrum-means being offset laterally with respect to the longitudinal axes of said cradle-member and said carriage-member to provide said article-lifting cradle-member with a lever action to facilitate lifting an article thereon; antifriction-means mounted on said article-lifting cradle for supporting an article thereon; and a ramp mounted on said article-lifting cradle-member on the side thereof adjacent said fulcrum-means, said ramp being arranged to be lowered into position to facilitate moving an article onto the antifriction article-supporting means of said article-lifting cradle-member when the latter is in its upright position with respect to said carriage.

3. In a device for handling rolled rugs and articles of a similar nature, the combination including: a carriage-member; an article-lifting cradle-member; fulcrum-means arranged to mount said article-lifting cradle-member on said carriage-member for pivotal movement upwardly relative thereto, said fulcrum-means being offset laterally with respect to the longitudinal axes of said cradle-member and said carriage-member to provide said article-lifting cradle-member with a lever action to facilitate lifting an article thereon; antifriction-means mounted on said article-lifting cradle for supporting an article thereon; a ramp; and pivotal-means arranged to mount said ramp on the side of said article-lifting cradle-member adjacent said fulcrum-means whereby said ramp is adapted to be lowered into position to facilitate loading an article onto the antifriction article-supporting means of said cradle-member when the latter is in its upright position with respect to said carriage.

4. In a device for handling rolled rugs and articles of a similar nature, the combination including: a carriage-member; an article-lifting cradle-member; fulcrum-means arranged to mount said article-lifting cradle-member on said carriage-member for pivotal movement upwardly relative thereto, said fulcrum-means being offset laterally with respect to the longitudinal axes of said cradle-member and said carriage-member to provide said article-lifting cradle-member with a lever action to facilitate lifting an article thereon; antifriction-means mounted on said article-lifting cradle for supporting an article thereon; a ramp; pivotal-means arranged to mount said ramp on the side of said article-lifting cradle-member adjacent said fulcrum-means whereby said ramp is adapted to be lowered into position to facilitate loading an article onto the antifriction article-supporting means of said cradle-member when the latter is in its upright position with respect to said carriage; and means carried by said article-lifting cradle-member arranged to be detachably engaged with said ramp to lock said ramp in article-unloading position.

5. In a device for handling rolled rugs and articles of a similar nature, the combination including: a carriage-member; an article-lifting cradle-member; fulcrum-means arranged to mount said article-lifting cradle-member on said carriage-member for pivotal movement upwardly relative thereto, said fulcrum-means being offset laterally with respect to the longitudinal axes of said article-lifting cradle-member and said carriage-member to provide said article-lifting cradle-member with a lever action to facilitate lifting an article thereon; antifriction article-supporting means mounted on said article-lifting cradle; a ramp; pivotal means arranged to mount said ramp on the side of said lifting-member adjacent said fulcrum-means whereby said ramp is adapted to be lowered into position to facilitate loading an article onto said article-lifting cradle-member when the latter is in its upright position with respect to said carriage; and means carried by said article-lifting cradle-member arranged to be detachably engaged with said ramp to lock said ramp in article-unloading position.

6. In a device for handling rolled rugs and articles of a similar nature, the combination including: a carriage-member adapted to be movably mounted on a supporting-surface; article-supporting elements carried by said carriage-member; an article-lifting member; fulcrum-means arranged to mount said article-lifting member on said carriage-member for pivotal movement upwardly relative thereto, said fulcrum-means being offset laterally with respect to the longitudinal axes of said carriage and said article-lifting member to provide said article-lifting member with a lever action to facilitate lifting an article onto the article-supporting elements of said carriage; a ramp; pivotal-means arranged to mount said ramp on the side of said lifting-member adjacent said fulcrum-means whereby said ramp is adapted to be lowered into position to facilitate loading an article on said article-lifting member when the latter is in its upright position with respect to said carriage; and feet on said article-lifting member on the ramp side thereof, said feet being disposed outwardly from the fulcrum of said article-lifting member and substantially in alignment with the pivotal-means of said ramp thereby to engage said carriage-supporting surface when said article-lifting member is pivoted into its upright position with respect to said carriage-member to support the weight of an article being moved up said ramp onto said article-lifting member.

7. A device for handling rolled rugs and articles of a similar nature, said device comprising: a carriage-member adapted to be movably mounted on a supporting-surface; an article-lifting cradle-member; fulcrum-means arranged to mount said cradle-member on said carriage-member for pivotal movement upwardly relative thereto, said fulcrum-means being offset laterally with respect to the longitudinal axes of said cradle-member and said carriage-member to provide the said article-lifting cradle-member with a lever action to facilitate lifting an article thereon; antifriction-means mounted on said article-lifting cradle for supporting an article thereon; and feet on said article-lifting cradle-member on the side thereof adjacent said fulcrum, said feet being disposed outwardly from said fulcrum-means and arranged to engage said carriage-supporting surface when said article-lifting cradle-member is pivoted into its upright position with respect to said carriage-member to support the weight of an article being moved onto the antifriction supporting-means of said article-lifting cradle-member.

8. A device for handling rolled rugs and articles of a similar nature, said device comprising: a carriage-member adapted to be movably mounted on a supporting-surface; an article-lifting cradle-member; fulcrum-means arranged to mount said article-lifting cradle-member on said carriage-member for pivotal movement upwardly relative thereto, said fulcrum-means being offset laterally with respect to the longitudinal axes of said cradle-member and said carriage-member to provide said article-lifting cradle-member with a lever action to facilitate lifting an article thereon; antifriction article-supporting means mounted on said article-lifting cradle-member; a ramp; pivotal-means arranged to mount said ramp on the side of said article-lifting cradle-member adjacent said fulcrum-means whereby said ramp is adapted to be lowered into position to facilitate loading an article onto said article-lifting cradle-member when the latter is in its upright position with respect to said carriage; and feet on said article-lifting cradle-member on the ramp side thereof, the said feet being disposed outwardly from the fulcrum-means of said article-lifting cradle-member and substantially in alignment with the pivotal-means of said ramp, thereby to engage said carriage-supporting surface when said article-lifting cradle-member is pivoted into its upright position wtih respect to said carriage-member to support the weight of an article being moved up said ramp onto the antifriction supporting-means of said article-lifting cradle-member.

9. An article-supporting device, comprising a base adapted to rest on a substantially level support; a platform hinged to said base near one side thereof so as to be swingable into article-supporting and article-transfer positions in which the same rests on top of said base and extends upwardly therefrom, respectively, said platform having beyond its hinge axis and the adjacent side of said base an extension adapted to rest on the support in the article-transfer position of said platform, and said extension being formed as a cradle adapted to hold an article in an elevated position above the support in the article-transfer position of said platform; and a ramp carried by said platform extension and adapted to rest on the support in the article-transfer position of said platform for moving an article from the support into said cradle and vice versa.

10. An article-supporting device as set forth in claim 9, in which said base is a wheeled carriage.

11. An article-supporting device as set forth in claim 9, in which said ramp extends, in the article-transfer position of said platform, above said cradle so that an article will drop from said ramp into said cradle.

12. An article-supporting device as set forth in claim 9, in which said ramp is pivotally carried by the end of said platform-extension.

13. An article-supporting device as set forth in claim 9, in which said platform is formed as a continuation of said cradle extension into which an article will gravitate from the latter on swinging said platform into its article-supporting position.

14. An article-supporting device as set forth in claim 9, in which said hinge connection between said base and platform is in close proximity to the inner end of said cradle so as to afford optimum leverage on said platform for swinging the latter with a load in said cradle into said article-supporting position.

WILLIAM C. GREF.
WILLIAM H. GREF.

REFERENCES CITED

The following references are of record in the file of this patent:

UNITED STATES PATENTS

| Number | Name | Date |
|---|---|---|
| 1,482,105 | Andrews et al. | Jan. 29, 1924 |
| 1,719,197 | Schlothan | July 2, 1929 |
| 1,789,391 | Roe | Jan. 20, 1931 |
| 1,931,354 | Morgan | Oct. 17, 1933 |
| 1,970,159 | Zehnbauer | Aug. 14, 1934 |
| 2,494,997 | Geistert | Jan. 17, 1950 |

FOREIGN PATENTS

| Number | Country | Date |
|---|---|---|
| 183,345 | Great Britain | July 27, 1922 |